Figure 1:
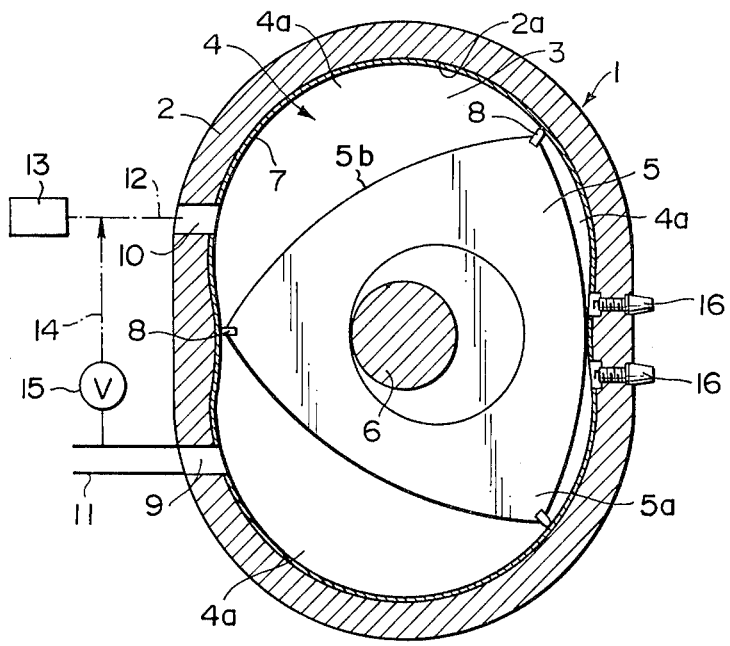

United States Patent [19]

Doi et al.

[11] 4,056,339
[45] Nov. 1, 1977

[54] ROTARY PISTON TYPE INTERNAL COMBUSTION ENGINES

[75] Inventors: Kunio Doi, Hiroshima; Kozo Koike, Kure; Toshiro Sasaki, Hiroshima, all of Japan

[73] Assignee: Toyo Kogyo Co., Ltd., Japan

[21] Appl. No.: 732,851

[22] Filed: Oct. 15, 1976

[30] Foreign Application Priority Data

Oct. 16, 1975 Japan .................................. 50-125007

[51] Int. Cl.² ............................................. F01C 21/00
[52] U.S. Cl. .................................................... 418/178
[58] Field of Search ................. 418/178, 179; 92/169; 123/193 CP, 193 C; 204/35 R, 51; 428/667

[56] References Cited

U.S. PATENT DOCUMENTS

| 2,314,604 | 3/1943 | Van der Horst | 204/35 R |
| 2,412,698 | 12/1946 | Van der Horst | 204/35 R |
| 2,800,443 | 7/1957 | Stareck et al. | 204/51 |
| 2,809,873 | 10/1957 | Cavileer | 92/169 X |
| 2,830,015 | 4/1958 | Raymond | 204/51 |
| 2,947,674 | 8/1960 | Andrisek | 204/35 R |
| 3,749,072 | 7/1973 | Schweiker | 123/193 C |
| 3,888,746 | 6/1975 | Uy et al. | 204/51 X |

Primary Examiner—Carlton R. Croyle
Assistant Examiner—Leonard Smith
Attorney, Agent, or Firm—Fleit & Jacobson

[57] ABSTRACT

Rotary piston engine having a rotor housing applied with a pin-point type porous chromium plating having porosity of 10 to 60 percent and a hardness of 930 to 1200 in Vicker's scale. The engine also has a rotor having apex seals each constituted by cast iron based material. Each apex seal has a sliding surface including 50 to 70 volume percent of carbides and a hardness of 700 to 900 in Vicker's scale.

5 Claims, 9 Drawing Figures

X100

X100

X100

X100

X100

ROTARY PISTON TYPE INTERNAL COMBUSTION ENGINES

The present invention relates to rotary piston type internal combustion engines and more particularly to such rotary piston engines having exhaust gas recirculating means.

Conventional rotary piston type internal combustion engines include a casing which comprises a rotor housing having an inner wall of trochoidal configuration and a pair of side housings gas-tightly secured to the opposite sides of the rotor housing to define a trochoidal cavity therein, a substantially polygonal rotor disposed in the cavity for rotation with apex portions in sliding contact with the inner wall of the rotor housing. It has been common in this type of rotary piston engines that the apex portions of the rotor are provided with apex seals which are adapted to slide on the inner wall of the rotor housing.

The apex seals and the inner wall of the rotor housing are considered as being operated under serious conditions. For example, they are subjected to mechanical loads such as vibrations, shock loads and frictional loads, as well as thermal loads such as thermal shock loads and thermal expansions. Although the inner wall of the rotor housing is plated with chromium to provide a hard wear-resistant surface, it has been experienced that the chromium plating surface is often formed with unusual wears which are called as chatter marks, scratches and excessive wears.

In order to solve such problems, it has been a common practice to employ apex seals having hardness which is considered as being most desirable with respect to that of the chromium plated surface on the inner wall of the rotor housing. Further, it has also been proposed by Japanese Patent Application Sho 46-120998 filed on Dec. 20, 1971 and disclosed for public inspection on Sept. 18, 1973 under the disclosure number of Sho 48-75003 to provide a channel type porous chromium plating on the inner wall of the rotor housing. It has also been known in the art to provide a relatively rough surface through honing treatment so that increased amount of lubricant is retained in the surface to improve lubrication between the surface and the apex seals on the rotor.

However, none of the aforementioned technique has been found effective in preventing the above surface defects in rotary piston engines having exhaust gas recirculating systems. More specifically, such exhaust gas recirculating system is provided, for the purpose of suppressing production of $NO_x$, to return to the intake system of the engine a certain amount of exhaust gas which may contain an appreciable amount of reactive gases, such as CO, HC, $CO_2$, $H_2O$, $SO_3$, $NO_2$ and $H_2S$. Such reactive gases may have influence on the film of lubricant oil, breaking the film and resulting in deterioration of the oil. Thus, the surface of the chromium plating on the inner wall of the rotor housing is apt to be formed with surface defects such as chatter marks and scratches, and the amount of wear of the surface is also increased.

The present invention has therefore an object to provide rotary piston engines wherein the aforementioned problems are eliminated.

Another object of the present invention is to provide rotary piston engines wherein surface defects on the inner wall of the rotor housing can be minimized even under operations with exhaust gas recirculation.

A further object of the present invention is to provide a novel combination of chromium plated inner walls of rotor housings and apex seals on rotors.

According to the present invention, the above and other objects can be accomplished by a specific type of chromium plating on the inner wall of the rotor housing and a specific combination of the hardness of the chromium plated surface and that of the apex seals. More specifically, the present invention proposes to provide on the inner wall of the rotor housing a pin-point type porous chromium plating which has a good oil retaining property and is of smaller total pore surface area with respect to total pore volume so that contact between the intake gas and the oil in the pores can be minimized.

According to a further feature of the present invention, use is made of a material having a high surface hardness and the hardness of the chromium plated surface is also increased accordingly. The hardness of the apex seals is determined in accordance with that of the chromium plated surface but in any event, the hardness both of the apex seals and of the chromium plated surface is greater than those in conventional rotary piston engines.

According to the feature of the present invention, the apex seal is formed by a cast iron based material containing 50 to 75 volume percent of carbides at least in the sliding surface and having a hardness in Vicker's scale of 700 to 900. The pin-point type porous chromium plating is of 10 to 60 percent of porosity and has a hardness in Vicker's scale of 930 to 1200. It is important to note that substantial part of the pores are discontinuous with each other.

Conventionally, in the art of porous chromium plating, there have been known three different types, one being the channel type, another the pin-point type and the other the type wherein plating is performed on a honed rough base surface. As previously referred to, there has been a proposal to apply the channel type porous chromium plating to rotor housings of rotary piston engines. The last mentioned type of chromium plating has been employed in the art of reciprocating piston engines as suggested by Japanese Patent Publication Sho 45-9448 published on Apr. 6, 1970.

It should be noted, however, neither of the channel type and the last mentiond type of chromium plating has been found effective when it is applied to the inner wall of the rotor housing to prevent surface defects such as chatter marks and scratches on the rotor housing due to the fact that the plated surface has port structures in the form of channels or grooves. This is particularly true when such chromium plating is applied to a rotary piston engine having exhaust gas recirculating means. Such pore structures have relatively large surface area with respect to volume so that the lubricant oil contained in the pores will have a greater possibility of being contacted by the recirculated exhaust gas. Further, in operation of the engine, the channel or groove shaped pores may bridge two adjacent working chambers across one apex portion of the rotor allowing gas flow through the bridging pores from one working chamber of higher gas pressure to the other working chamber of lower gas pressure. Lubricant oil contained in such pores may then be splashed into the working chamber of lower pressure under the influence of gas flow through the pores, so that consumption and deterioration of oil are promoted resulting in a poor lubrication along the inner wall of the rotor housing.

It should further be noted that, from the viewpoint of manufacture, it is very difficult to provide a hard surface by means of a channel type chromium plating. According to the inventor's experience, the surface hardness of such channel type porous chromium plating was 800 in Vicker's scale at the highest. Thus, it is very difficult to provide an adequate wear-resistant property by the channel type chromium plating.

According to the present invention, in order to eliminate the aforementioned problems encountered in applying the conventional channel type porous chromium plating to rotary piston engines having exhaust gas recirculating means, use is made of a pin-point type porous chromium plating having specific hardness and specific porosity.

It should be noted, however, that even when such pin-point type porous chromium plating is employed a certain number of pores may be linked together or a certain number of discontinuous pores may be concentrated in a relatively small area due to the fact that it is very difficult to produce a uniform plated layer throughout the inner wall surface of the rotor housing which is of a configuration deviated from a true cylindrical shape. In fact, even when the plating process is performed under a constant current density and a constant bath temperature, the resultant plated layer has different porosity between the area around the minor axis and that around the major axis of the trochoid. More specifically, the porosity of the plated layer will be greater in the area on or in the vicinity of the major axis than in the area on or in the vicinity of the minor axis of the trochoid. Further, there is a greater tendency in the area on or in the vicinity of the major axis that discontinuous pores are concentrated. The above tendencies become more appreciable after mechanical finish treatment.

Thus, it cannot be avoided that a certain number of pores are linked together or concentrated in limited areas, however, the objects of the present invention can be accomplished by a porous chromium plating wherein substantial part of the pores are discontinuous or independent from each other and such discontinuous pores are distributed in substantial part of the plated surface. More specifically, according to the present invention, at least 50 percent of pores in the plated layer must be smaller than 50 microns in terms of equivalent diameter which can be obtained from the area of each pore as the diameter of a circle having the same area. More preferably, the pores should include at least 70 percent of pores smaller than 40 microns in terms of the equivalent diameter.

According to the present invention, the plated layer has a porosity which is between 10 to 60 percent. With the porosity less than 10 percent, adequate amount of lubricant oil cannot be retained in the plated layer so that there will be inadequate lubrication particularly under operation with exhaust gas recirculation. Therefore, surface defects such as chatter marks and scratches will possibly be produced in the plated surface beyond an allowable limit. Further, wear of the plated surface will also be increased.

With the porosity greater than 60 percent, the effective area of flat sliding surface will be decreased to such an extent that a corresponding increase in bearing pressure applied from the apex seal to the plated surface causes an increase in wear of the plated layer. Since chatter marks are apt to be produced particularly in an area on or in the vicinity of the major axis of the trochoid, the porosity of the plating should be between 30 and 60 percent in such area. Preferable range of average porosity is between 20 and 50 percent.

According to the present invention, the plated layer on the rotor housing has a hardness which is between 930 and 1200 in Vicker's scale. With the hardness less than 930, surface defects such as chatter marks and scratches are apt to be produced particularly under operation with exhaust gas recirculation. With the hardness greater than 1200, there will be an increase in wear of the apex seals. Preferable range of the hardness of the plated layer is between 960 and 1100 in Vicker's scale.

It is considered that the depth of the pore is an important factor in respect of oil retaining property, however, it may depend on the hardness and the porosity. The depth would be 7 to 30 microns.

It is considered that, under operations with exhaust gas recirculation, the apex seals are subjected to very serious conditions. The recirculated exhaust gas may possibly break the film of lubricant oil on the inner wall of the rotor housing so that the apex seals may be brought into metal-to-metal contact with the plated layer on the inner wall of the rotor housing. Therefore, the apex seals may produce surface defects such as chatter marks and scratches on the surface of the chromium plating.

In order to avoid this problem, it is therefore desirable that the apex seal includes as much non-metallic components as possible in the sliding surface. Further, it should be of highly wear-resistant property and of a hardness which is to some extent lower than that of the plated chromium layer. The inventors have found that cast iron is a desirable material for producing apex seals meeting such requirements and provides satisfactory property suitable for use in co-operation with the chromium plating. The term "cast iron" as used herein does not necessarily mean that the apex seal shall be produced by means of casting technique but broadly includes an iron based material having compositions of cast iron. In fact, the apex seals may be produced from particles of cast iron through sintering process. Wear-resistant cast iron is preferable for the purpose but normal cast iron may also be used. Thus, the present invention contemplates a use of cast-iron based material for producing apex seals.

In order to obtain a desired concentration of carbides in the sliding surface of the apex seal, it is convenient to employ a chilling process in case where the seal is formed by a casting technique. When the seal is produced through a sintering process, desired concentration of carbides can be obtained simply by using particles containing adequate amount of carbon or carbides.

The inventors have found that satisfactory results can be obtained by apex seals containing 50 to 75 volume percent of carbides in the sliding surface and having a hardness of 700 to 900 in Vicker's scale. With the carbides concentration less than 50 volume percent, there will be an increase in the metal-to-metal contact between the seals and the inner wall surface of the rotary piston engine, particularly under an operation with the exhaust gas recirculation, possibly producing surface defects such as chatter marks and scratches on the inner wall surface of the rotor housing. The upper limit of the carbides concentration has been determined from the viewpoint of manufacture, strength and tenacity.

With the hardness less than 700, the wear resistance of the seal will become insufficient when the engine is operated with the exhaust gas recirculation. With the hardness exceeding 900, it becomes too close to the hardness of the chromium plating possibly resulting in excessive wear of the plated layer. Further, the plated layer may be scratched when there is a shortage of lubrication oil. Most preferably, the hardness should be within the range of 720 to 850 in Vicker's scale.

Figure 3:
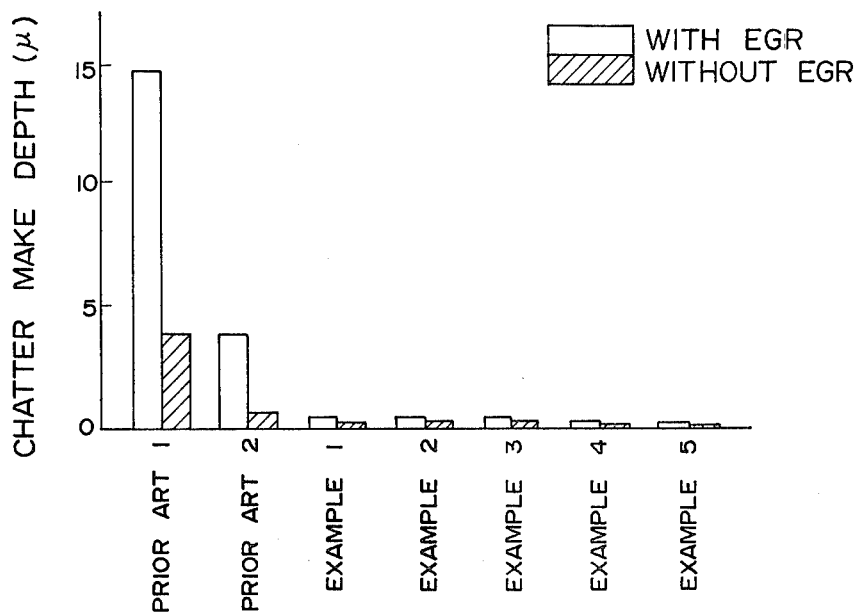
Figure 4:
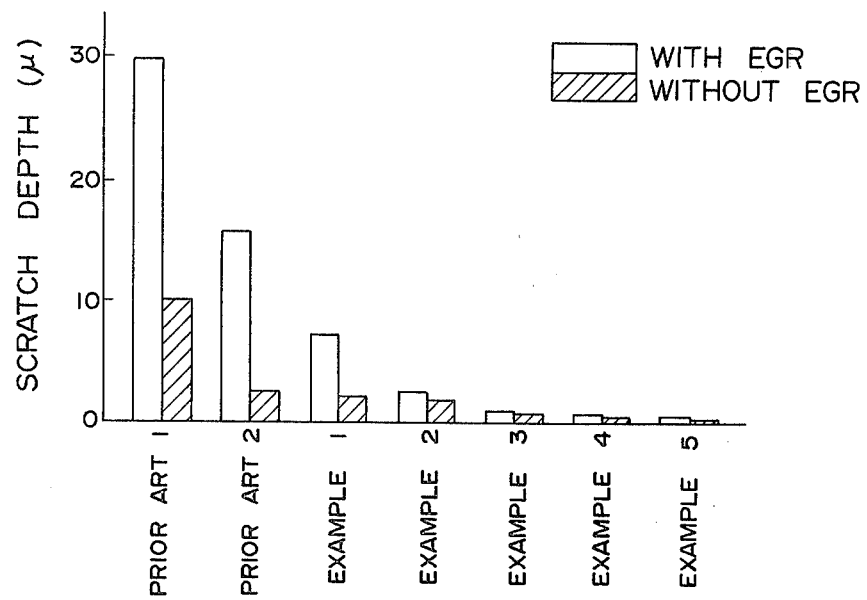
Figure 5:
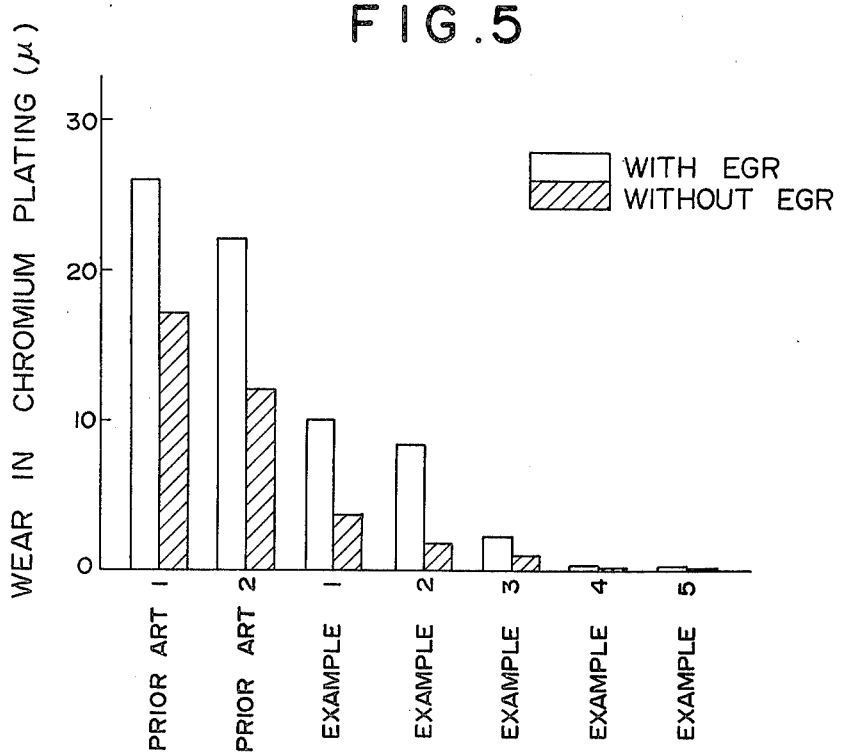

Examples of the present invention will hereinafter be described in comparison with conventional ones. For the purpose, references will also be made to the accompanying drawings, in which:

FIG. 1 is a sectional view of a rotary piston engine to which the present invention can be applied;

FIGS. 2(a) through (e) are microscopic photographs showing pin-point type porous chromium platings employed in engines in accordance with the present invention; and FIGS. 3 through 5 are diagrams showing the effects obtained by the present invention.

Referring to FIG. 1, there is shown a rotary piston engine to which the present invention is applied. As conventional in the art, the engine comprises a casing 1 including a rotor housing 2 which has an inner wall 2a of trochoidal configuration and a pair of side housings 3 secured to the opposite sides of the rotor housing 2 to define a rotor cavity 4. A rotor 5 of substantially triangular configuration is disposed in the cavity and supported by an eccentric shaft 6 for rotation with apex portions 5a in sliding contact with the inner wall 2a of the rotor housing 2 to define working chambers 4a of variable volume between the inner wall 2a of the rotor housing 2 and flanks 5b of the rotor 5. The rotor housing 2 is chromium plated on the inner wall 2a to form a porous plated layer 7 and the rotor 5 is provided on each apex portion 5a with an apex seal 8 which has a sliding surface adapted to be brought into sliding contact with the plating 7.

The rotor housing 2 is formed with an exhaust port 9 to open to one of the working chambers 4a which is in exhaust stroke and also an intake port 10 to open to another working chamber 4a which is in intake stroke. It should be noted that such intake port may be provided in one or both of the side housings 3 in lieu of or in addition to the intake port 10 in the rotor housing 2. The exhaust port 9 is in communication with an exhaust passage 11 and the intake port 10 with an intake passage 12 having a carburetor 13. In order to provide a recirculation of exhaust gas, the exhaust passage 11 is connected through a recirculation passage 14 having a control valve 15 to the intake passage 12. The rotor housing is also provided with ignition plugs 16 as conventional in the art.

In order to apply the present invention to rotary piston engines, the rotor housings of rotary piston engines were subjected to chromium plating under the conditions shown in Table I.

Table I

| Ex. No. | Bath | Current Density A/dm² | Temp. °C | Time min. | Reverse Current Density A/dm² | Reverse Current Supply Time (min) |
|---|---|---|---|---|---|---|
| 1 | CrO₃ 260g/l H₂SO₄ 2.6 g/l | 52 | 50 | 130 | 45 | 15 |
| 2 | " | " | " | " | 48 | " |
| 3 | " | " | " | " | 50 | " |
| 4 | " | " | " | " | 53 | " |

Table I-continued

| Ex. No. | Bath | Current Density A/dm² | Temp. °C | Time min. | Reverse Current Density A/dm² | Reverse Current Supply Time (min) |
|---|---|---|---|---|---|---|
| 5 | " | " | " | " | 55 | " |

The plated samples were subjected to honing treatment as follows.

| | | |
|---|---|---|
| (a) Rough Honing: | Grinder | WA 220. 100 |
| | Pressure | 5 kg/cm² |
| | Time | 60 sec. |
| | Frequency of the Grinder | 200 cycle/min |
| | Amplitude of the Grinder | 22 mm |
| | Workpiece Rotating Speed | 100 rpm |
| | Speed of Grinder Holder | 33 rmp |
| (b) Finish Honing | Grinder | WA 1000 L |
| | Pressure | 4 kg/cm² |
| | Time | 60 sec. |
| | Frequency of of Grinder | 40 cycle/min. |
| | Amplitude of the Grinder | 22 mm |
| | Workpiece Rotating Speed | 100 rpm |
| | Speed of Grinder Holder | 33 rpm |

Figure 2A:
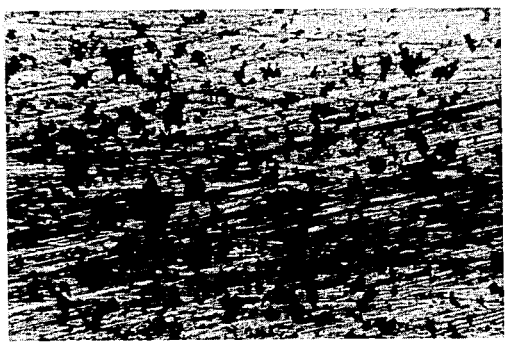
Figure 2B:
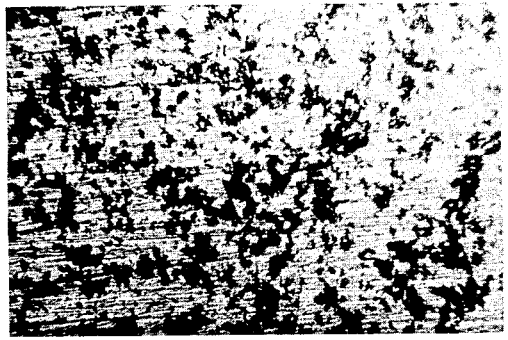
Figure 2C:
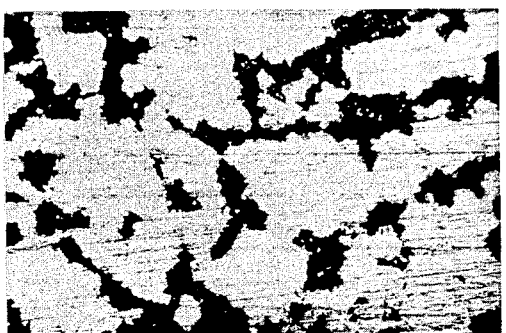
Figure 2D:
Figure 2E:
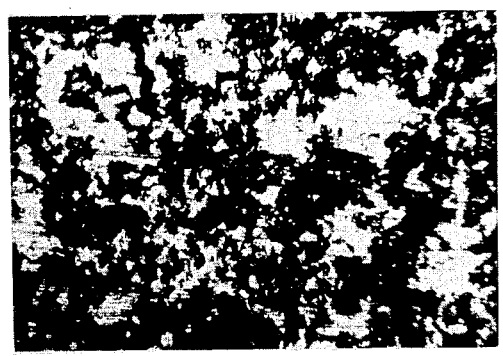

FIGS. 2(a) through (e) show in microscopic photographs the surface of the chromium platings in accordance with the Examples 1 through 5, respectively. In these photographs, it will be noted that the platings of the Examples 1 through 5 have porosities of 10%, 20%, 25%, 30% and 40%, respectively. In all of the Examples, the plated layers had hardness of 1000 in Vicker's scale. In FIGS. 2(c), it is noted that the configurations of the pores are different from those in other examples. It is understood that certain number of pores have concentrated to produce larger or grown-up pores in this example. However, even in this example, no significant change was noted in wear resistant property.

Rotor housings thus prepared were assembled in rotary piston engines. For the purpose of comparing the engines thus prepared in accordance with the present invention over conventional engines, two different types of conventional engines were also prepared.

Prior Art I: The rotor housing of this engine was prepared by subjecting the inner wall surface thereof to rough honing to provide a rough surface and performing chromium plating process to produce on the rough surface a plated layer having a surface roughness of 10 to 16 microns. The plated layer had a hardness of 1000 in Vicker's scale.

Prior Art II: The rotor housing of this engine was provided on its inner wall surface with channel type porous chromium plating having porosity of 28 percent and a hardness of 800 in Vicker's scale.

The rotary piston engines prepared as described above have been subjected to the following tests:

1. Chatter Mark Tests

The engines were subjected to 6,000 cycles of operating pattern, each cycle including steps of operating the engines under no load at 1500 rpm for 20 seconds, then under full load at 7000 rpm with wide open throttle position for 75 minutes and thereafter under no load at 1500 rpm with closed throttle position. Tests were performed with and without the exhaust gas recirculation. During the operation with the exhaust gas recirculation, exhaust gas was returned to the intake system by an amount which is 10 percent of total intake mixture. The operations were performed with lead-free gasoline. After the operation, the engines were disassembled and investigations were made for the discrepancies on the inner walls of the rotor housings.

2. Scratch Tests

The engines were operated at an idling speed for 200 hours under the cooling water temperature of 30° C. The tests were performed with and without the exhaust gas. During the operation with the exhaust gas recirculation, the exhaust gas was returned to the intake system by an amount equal to 10 percent of total intake mixture. The operation was performed with lead-added gasoline. After the operation, the engines were disassembled and investigated for the discrepancies on the inner walls of the rotor housings.

3. Tests for Wear in the Chromium Platings

The engines operated as in the chatter mark tests were investigated for the wear in the chromium platings.

The results are shown in Table II and plotted in the diagrams in FIGS. 3 through 5.

Table II

|  |  | Prior Art I | Prior Art II | Example 1 | Example 2 | Example 3 | Example 4 | Example 5 |
|---|---|---|---|---|---|---|---|---|
| Porosity (%) |  | / | 28 | 10 | 20 | 25 | 30 | 40 |
| Hardness (Vicker's Scale) |  |  | 1000 | 800 | 1000 | 1000 | 1000 | 1000 | 1000 |
| Type of Apex Seal |  |  | B | A | A | A | B | B | B |
| Chatter | Yes | 14.7 | 3.8 | 0.50 | 0.52 | 0.52 | 0.40 | 0.30 |
| (in Depth μ) | No | 3.8 | 0.7 | 0.40 | 0.40 | 0.41 | 0.30 | 0.24 |
| Scratch | Yes | 29.8 | 15.5 | 7.2 | 2.4 | 1.1 | 0.87 | 0.65 |
| (Depth μ) | No | 10.5 | 2.6 | 2.0 | 1.9 | 0.9 | 0.68 | 0.50 |
| Wear of Cr | Yes | 26.2 | 22.0 | 10.0 | 8.4 | 2.4 | 0.50 | 0.36 |
| Plating (μ) | No | 17.0 | 12.0 | 3.8 | 2.0 | 1.2 | 0.40 | 0.24 |

| Note: | Apex Seals Type | C | Si | Mn | Ni | Mo | Cu | Fe | Carbides | Hardness (vicker's) |
|---|---|---|---|---|---|---|---|---|---|---|
|  | A | 3.0 | 2.2 | 0.7 | 2.0 | 0.8 | 1.0 | Balance | 55% | 750 |
|  | B | 4.2 | 2.2 | 0.7 | 2.0 | 1.0 | 1.0 | Balance | 65% | 850 |

From the test results, it will be noted that, according to the present invention, chatter marks can be significantly decreased under operations with the exhaust gas recirculation as compared with those in conventional engines. It should also be noted that, in the engines in accordance with the present invention, scratches on and wear in the chromium platings could be significantly decreased as compared with those in conventional engines.

Further tests were also made with engines having rotor housings provided on the inner walls thereof with pin-point type porous chromium platings, of which porosities were 5%, 50%, 60% and 70% respectively. Results of the tests are shown in Table III.

Table III

|  | E-GR | Example 6 | Example 7 | Example 8 | Example 9 |
|---|---|---|---|---|---|
| Porosity % |  | 5 | 50 | 60 | 70 |
| Hardness (Vicker's scale) |  | 1000 | 1000 | 1000 | 1000 |
| Type of Apex Seal |  | A | A | B | B |
| Chatter Depth | Yes | 3.0 | 0.30 | 0.40 | 0.40 |
| (μ) | No | 1.5 | 0.24 | 0.32 | 0.32 |
| Scratch Depth | Yes | 12.0 | 1.5 | 6.0 | 10.0 |

Table III-continued

|  | E-GR | Example 6 | Example 7 | Example 8 | Example 9 |
|---|---|---|---|---|---|
| (μ) | No | 2.0 | 1.0 | 5.0 | 5.0 |
| Wear of Cr | Yes | 18.0 | 6.0 | 10.0 | 15.0 |
| Plating (μ) | No | 10.0 | 4.2 | 8.0 | 11.3 |

From the above test results, it will be noted that the range of porosity of the chromium plating is critical in obtaining desirable properties in accordance with the present invention.

It is understood that, according to the present invention, desirable results can be obtained by means of a combination of the pin-point type porous chromium plating on the inner wall of the rotor housing, the increased values of the hardness of the chromium plating on the inner wall of the rotor housing and of the sliding surface of the apex seal, specific relationship between the hardness of the plating and that of the sliding surface of the apex seal, and the increased value carbides concentration in the sliding surface of the apex seal. Since the pin-point type porous chromium plating is employed, it is possible to decrease the area with respect to the volume of the lubricant oil which may be brought into contact with the recirculated exhaust gas. Further, there will be less possibility that the lubricant oil retained in the pores is splashed by gas stream passing through the pores as has been experienced in the engines having channel-type porous chromium plating on the inner wall of the rotor housing. Thus, it is possible to decrease lubricant oil comsumption and prevent deterioration of oil. Since the hardness of the chromium plating and that of the sliding surface of the apex seal are increased and have specific relationship with each other, the wear-resistant property of the plating can be significantly increased. The specific carbides contents in the sliding surface of the apex seal contribute to the improvement of the wear-resistant property. Thus, it should be noted that the present invention is very useful in rotary piston engines having exhaust gas recirculation systems.

The invention has thus been shown and described with reference to specific examples, however, it should be noted that the invention is in no way limited to the details of such examples. Therefore, it should be contemplated that the present invention is limited only by the appended claims.

We claim:

1. Rotary piston engine comprising a casing which comprises a rotor housing having an inner wall of trochoidal configuration and a pair of side housings gastightly secured to the opposite sides of the rotor housing to define a trochoidal cavity therein, a substantially polygonal rotor disposed in the cavity for rotation with apex portions in sliding contact with the inner wall of the rotor housing so that working chambers of variable volume are defined in said cavity between said inner wall of the rotor housing and flanks of the rotor, intake means for introducing intake gas into one of said working chambers which is in intake stroke, exhaust means for exhausting gas from another working chamber which is in exhaust stroke, said rotor housing being applied on the inner wall thereof with pin-point type porous chromium plating mainly including discontinuous pores and having a porosity of 10 to 60 percent and a hardness of 930 to 1200 in Vicker's scale, said rotor being provided on each of the apex portions with an apex seal having a sliding surface adapted to be brought into sliding contact with the chromium plating on the inner wall of the rotor housing, said apex seal being constituted by cast-iron based material with 50 to 70 volume percent of carbides in at least in the sliding surface and having a hardness of 700 to 900 in Vicker's scale at the sliding surface.

2. Rotary piston engine in accordance with claim 1 in which said porous chromium plating includes pores of which at least 50 percent are of dimensions smaller than 50 microns in terms of equivalent diameter which can be obtained from area of each pore as diameter of a circle having the same area.

3. Rotary piston engine in accordance with claim 1 which further includes exhaust gas recirculating passage means connecting said intake and exhaust means, and control valve means provided in said passage means.

4. Rotary piston engine in accordance with claim 1 in which said apex seal is made of a casted material.

5. Rotary piston engine in accordance with claim 1 in which said apex seal is made of a sintered material.

* * * * *